United States Patent
Vuong

[11] Patent Number: 5,496,448
[45] Date of Patent: Mar. 5, 1996

[54] EVAPORATION MEANS AND METHOD

[75] Inventor: Dinh-Cuong Vuong, Nederland, Tex.

[73] Assignee: Texaco Inc., White Plains, N.Y.

[21] Appl. No.: 155,364

[22] Filed: Nov. 22, 1993

[51] Int. Cl.$^6$ .................. B01D 3/00; C02F 1/04
[52] U.S. Cl. .......... 202/235; 159/26.1; 159/43.1; 202/237; 202/262; 202/270; 203/10; 203/100; 165/159; 165/174
[58] Field of Search ............ 203/10, 100; 159/26.1, 159/27.4, 43.1, 27.1; 165/159, 174; 202/237, 235, 262, 270

[56] References Cited

U.S. PATENT DOCUMENTS

| | | | |
|---|---|---|---|
| 389,075 | 9/1888 | Hayes | 159/27.1 |
| 828,524 | 8/1906 | Warren | 159/27.1 |
| 2,467,529 | 4/1949 | Hormel | 159/27.1 |
| 2,584,357 | 2/1952 | Loebel | 159/27.3 |
| 2,718,215 | 9/1955 | Eckstrom | 159/27.1 |
| 3,242,970 | 3/1966 | Schmole | 159/27.4 |
| 4,288,285 | 9/1981 | Houston | 159/27.4 |
| 4,415,407 | 11/1983 | Longuet | 159/27.4 |
| 4,857,144 | 8/1989 | Casparian | 159/27.4 |

FOREIGN PATENT DOCUMENTS

| | | | |
|---|---|---|---|
| 0004961 | 2/1971 | Japan | 159/27.1 |
| 0007154 | of 1910 | United Kingdom | 159/27.1 |

*Primary Examiner*—Virginia Manoharan
*Attorney, Agent, or Firm*—Kenneth R. Priem; Richard A. Morgan

[57] ABSTRACT

An evaporator, which includes a water chamber for receiving water to be evaporated. A plurality of evaporator tubes which when heated, and when water is on an inner wall of a tube, evaporates at least a portion of that water. A plurality of distributors spatially connecting the water chamber with the evaporator tubes in a manner so that each distributor uniformly and distributes the water from the water chamber to an inner wall of a corresponding evaporator tube. A heat source, which heats the plurality of tubes to an evaporation temperature. Apparatus distills the water vapor resulting from the water evaporation to provide distilled water.

4 Claims, 3 Drawing Sheets

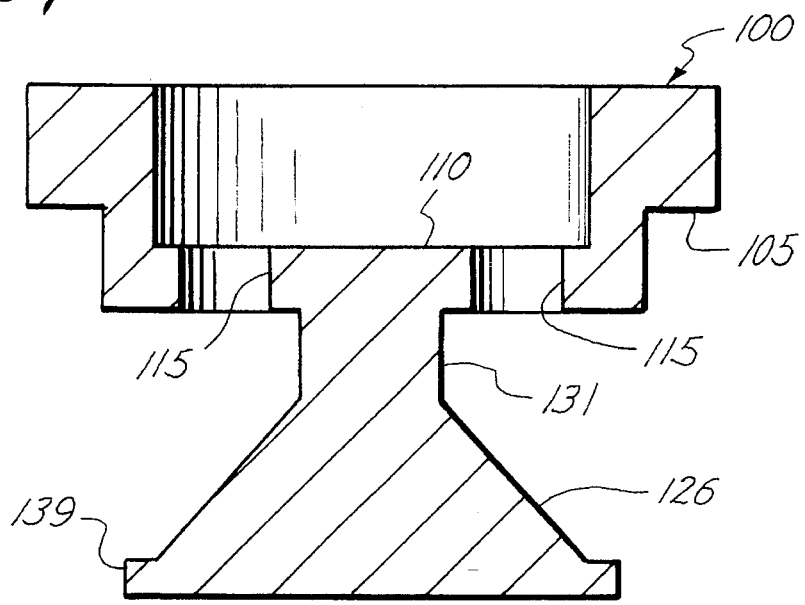
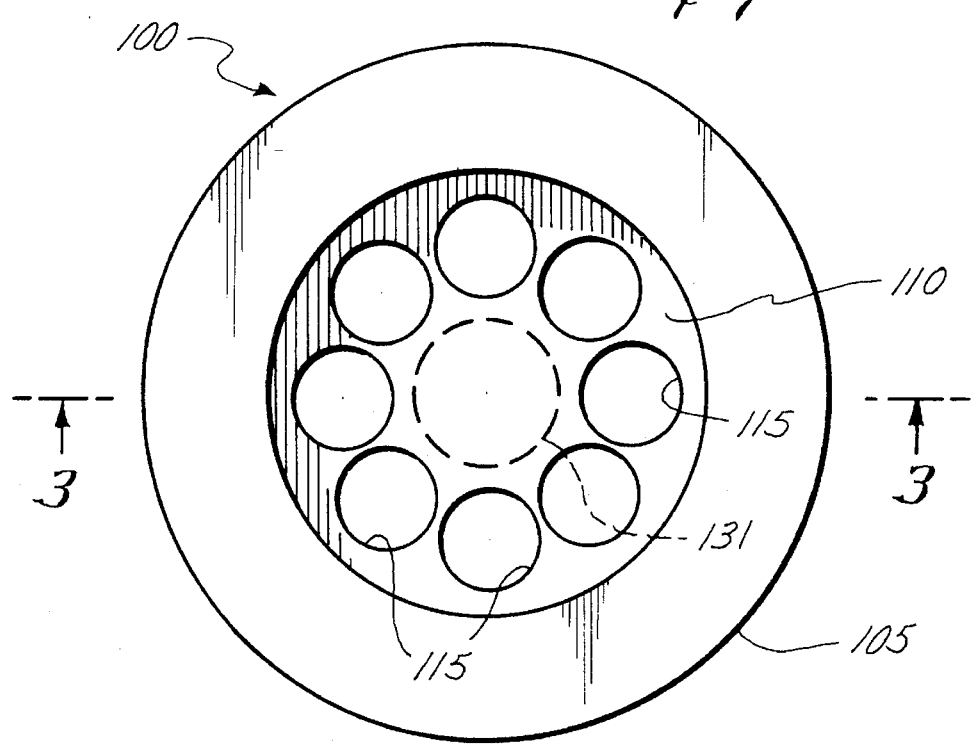

EVAPORATION MEANS AND METHOD

BACKGROUND OF THE INVENTION

Field of the Invention

The present invention relates to all distillation means and methods in general and, more particularly, to evaporation.

SUMMARY OF THE INVENTION

An evaporator, which includes a water chamber for receiving water to be evaporated. A plurality of evaporator tubes which when heated, and when water is on an inner wall of a tube, evaporates at least a portion of that water. A plurality of distributors spatially connecting the water chamber with the evaporator tubes in a manner so that each distributor uniformly distributes the water from the water chamber to an inner wall of a corresponding evaporator tube. A heat source, which heats the plurality of tubes to an evaporation temperature. Apparatus condenses the water vapor resulting from the water evaporation to provide distilled water.

The objects and advantages of those inventions will appear more fully hereinafter from a consideration of details of description which follows, taken together with the accompanying drawings, wherein one embodiment of the invention is illustrated by way of example. It is to be expressly understood, however, that the drawings are for illustration purposes only and are not to be construed as defining the limits of the invention.

BRIEF DESCRIPTION OF THE DRAWINGS

FIG. 3 is a cut-away drawing along the line 3—3 in the direction of the arrows shown in FIG. 4 of the distributor shown in FIG. 2.

FIG. 4 is a top view of the distributor shown in FIG. 2.

DESCRIPTION OF THE INVENTION

Generally waste water has to be handled under current environmental regulatory actions. One such process uses an evaporator for zero discharge of waste water which recovers clean water for reuse as intake water in the discharging facility and making a low volume byproduct stream for final disposal or resource recovery. The leading technology is waste water distillation, which produces clean distilled water and concentrated brine as a byproduct. The evaporator is a water film evaporator in which the water falls on the inside of evaporator tubes which are heated by steam to provide the evaporation. The hot brine and water vapors exits from the bottom of the evaporator tube and are separated in the brine removal means. A portion of the brine is blown down as product brine and most of the brine is recirculated by the brine pump back up to the top of the tube. If the water is not effectively provided to an evaporator tube, particularly for waste water, which contains fouling and scaling materials, those materials are deposited on the sides of the evaporator tube. The water is designed to flow uniformly to prevent local areas of high concentration of dryness which would lead to scaling or fouling at those points and thus, the loss of heat transfer. The present invention achieves a uniform flow of water in the evaporator tubes thereby increasing the efficiency of evaporation and minimizing fouling and scaling of the evaporator tube.

Figure 1:
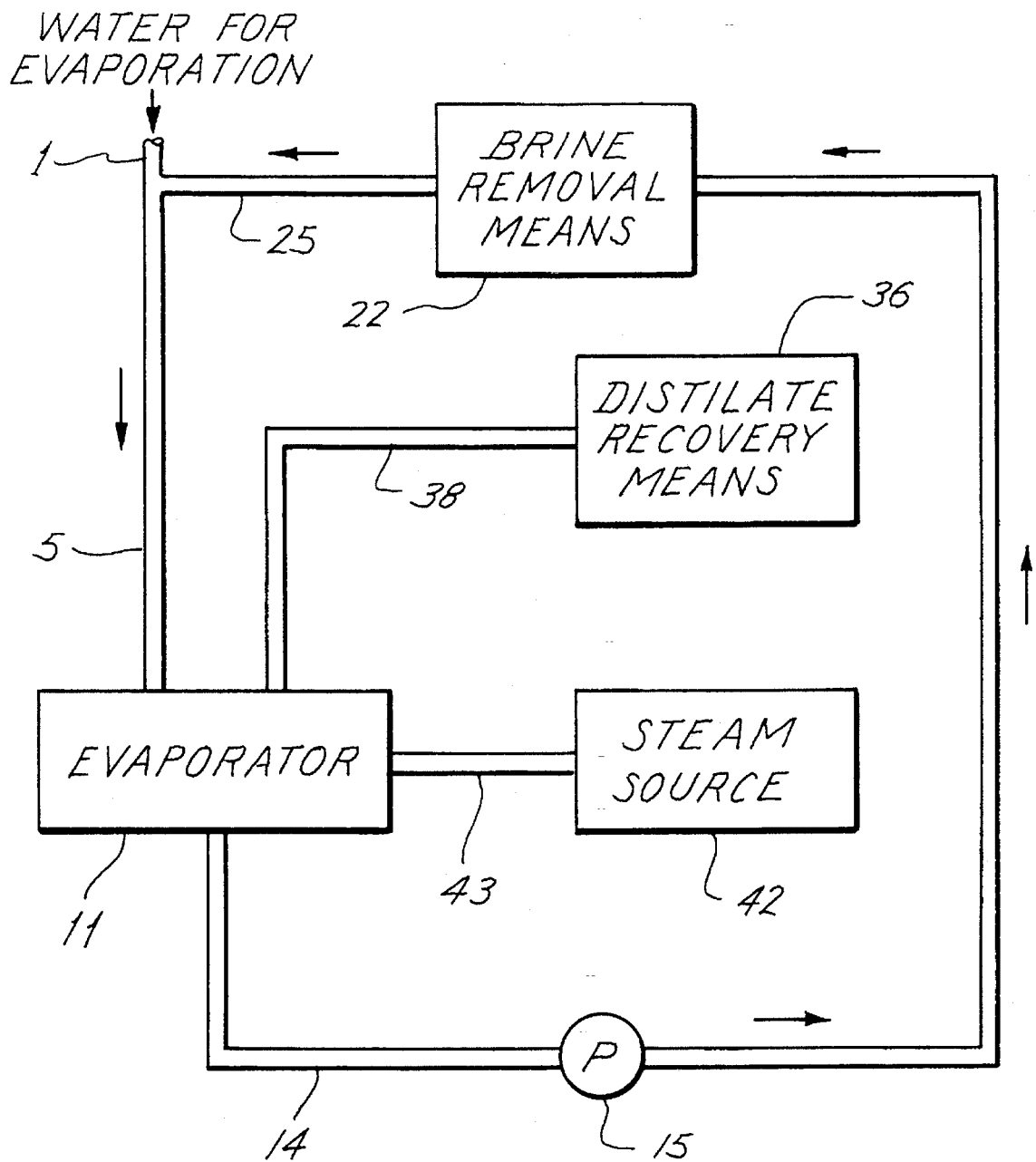
FIG. 1 is a partial simplified block diagram and a partial schematic of an evaporation system utilizing an evaporator constructed in accordance with the present invention.

With reference to FIG. 1, there is shown a conventional-type evaporation system in which water enters an evaporator 11 through lines 1 and 5. Evaporator 11 is a conventional-type evaporator except as modified in accordance with the present invention which will be explained in greater detail later. The object of evaporator 11 is the evaporation of water; however, brine still accumulates in evaporator 11. The brine accumulation is recirculated via line 14 by a pump 15 and pumped through brine removal means 22 where the water is then returned by line 25 to line 5. Also shown in FIG. 1 are distillate recovery means 36 which condenses the water vapor coming from evaporator 11. The evaporation within evaporator 11 via line 38 occurs due to the steam heat provided by a steam source 42 via line 43.

Figure 2:
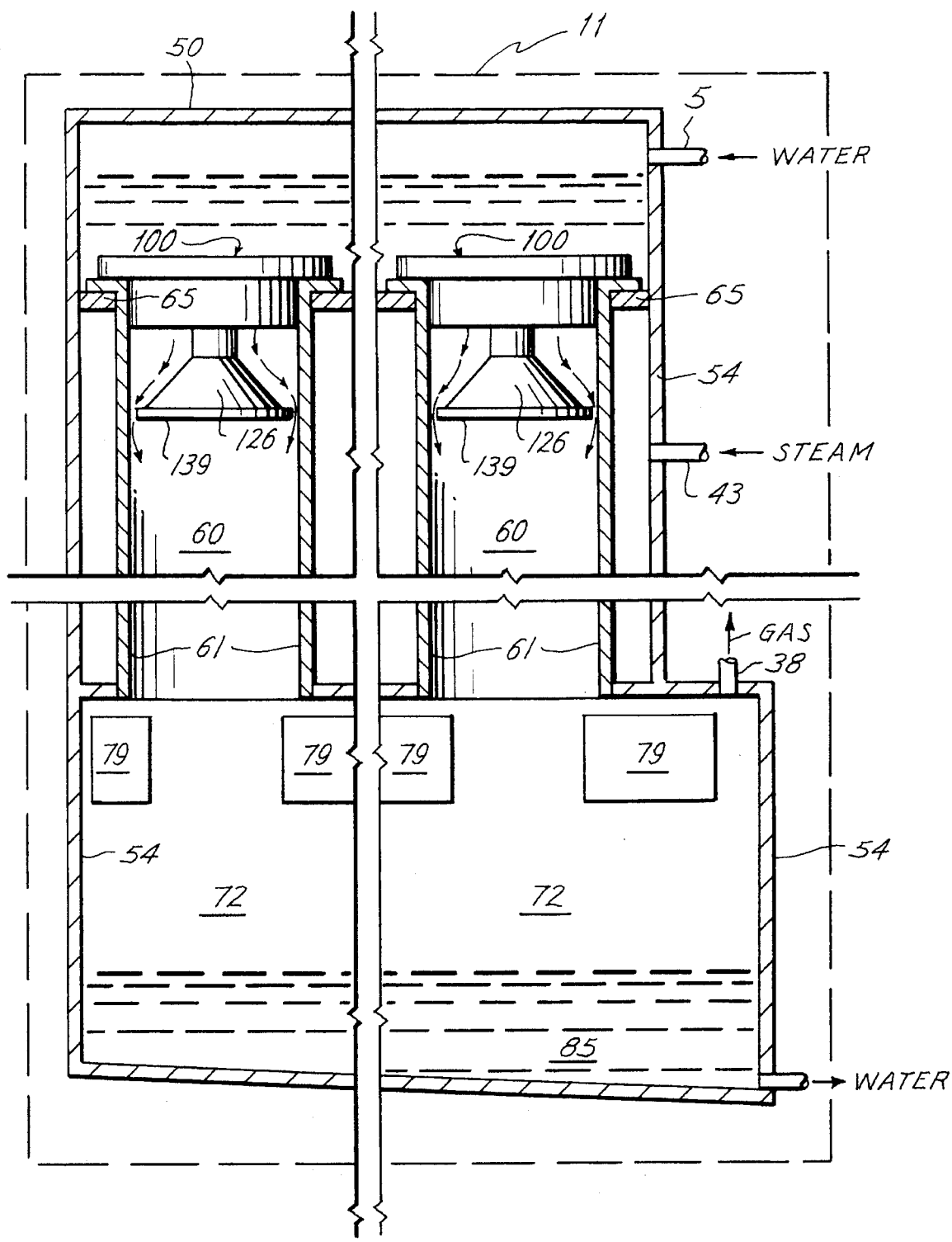
FIG. 2 is a diagrammatic representation of the evaporator shown in FIG. 1.

Referring now to FIG. 2, evaporator 11 is shown as having vertical separation by cut-away lines and horizontal separation by cut-away lines. The vertical separation is to indicate that there is a plurality of tubes used for evaporation. The horizontal separation is to indicate that there is great length to these tubes, some of them 20 to 30 feet in length, and also to show the water accumulation 85 at the bottom of evaporator 11.

Water evaporator 11 includes a dome 50 which is connected to and sealed with sidewalls 54 of evaporator 11. A plurality of tubes 60 is held in place by a plate 65. Tubes 60 extend down to a chamber 72. Located in chamber 72 are conventional demisters 79, which perform the function of vapor/liquid separation.

Heretofore, an arrangement providing water to each tube was general in nature and it was such that it caused water to run down one location within a tube.

The present invention is a fluid distributor 100. Referring to FIGS. 3 and 4 as well, FIG. 3 is a cut-away view of distributor 100 in the direction of lines 3—3 shown in FIG. 4. As shown in FIG. 3, distributor 100 is a one piece unit, molded so that it fits inside of an evaporator tube 60 supported by the overhang 105. A horizontal portion 110 is formed having holes 115 therethrough. A preferred hole arrangement is a pattern of eight holes, each hole arranged along a radius from a horizontal center of distributor 100 having a 45° relationship to the radii on each side of it. Each hole also has a 5/16 inch diameter.

There is a lower truncated conical portion 126 of distributor 100 which flares out at approximately 45° from a vertical cylindrical portion 131. Another horizontal portion 139 provides the bottom end of distributor 100. The vertical portion 131 ensures that the distribution of water is definitely into evaporator tube 60.

Some other dimensions of distributor 100 that have been used are along the lines for an evaporator tube 60, are an outer diameter of two inches and an inner diameter of 1.944 inches. The maximum diameter of horizontal portion 110 is substantially the same as the inner diameter of evaporator tube 60. However, it should be further noted that the bottom horizontal element 139 has a diameter of 1.756 inches while the junction of the 45° of the conical portion 126 has a diameter of 1.5 inches, but leaves a little lip at the end of the conical section 126. The difference between the diameter of the horizontal bottom portion of distributor 100 and wall 61 of evaporator tube 60 creates a gap of approximately 3/32.

Thus, as shown by arrows in FIG. 2, the water passes straight down from holes 115 and meets conical section 126 where the water is directed downward and outward. The water flows downward and outward until it counts bottom horizontal element 139 which causes the water to flow out in a general horizontal direction subject to the pull of gravity over that gap of 3/32 inches. The water then comes in contact with wall 61 of evaporator tube 60 and flows down wall 61.

What is claimed is:

1. A distillation apparatus comprising:

water means for receiving water to be distilled, means for evaporating water when heated comprising a plurality of tubes for providing a water vapor, a plurality of distributor means spatially related to the water means and to the plurality of tubes, each distributor means for uniformly distributing water from the water means to an inner wall of a corresponding tube, comprising a single molded body including:

(i.) a first passing means portion perpendicular to a longitudinal axis of the corresponding tube, having holes arranged in a pattern, (ii.) a second, cylindrical portion extending into the corresponding tube, (iii.) a third truncated conical portion having a conical angle with the longitudinal axis of the corresponding tube to direct the passed water from the passing means to move downward and outward, and (iv.) a fourth, disk shaped portion having a diameter perpendicular to the longitudinal axis of the corresponding tube, sufficiently smaller than the diameter of the corresponding tube so as to direct water in a substantially horizontal direction to encounter the inner wall of the corresponding tube, heat means for heating the plurality of tubes to an evaporation temperature, and means for condensing the water vapor from the plurality of tubes to provide distilled water.

2. The distillation apparatus of claim 1 wherein in the passing means there are eight holes uniformly horizontally spaced around the longitudinal axis of the corresponding tube.

3. The distillation apparatus of claim 2 in which the diameter of each hole is 5/16 inches.

4. The distillation apparatus of claim 3 in which not all of the water provided to the plurality of tubes is evaporated so that some water issues from the plurality of tubes, and further comprising means for removing salt from the water issuing from the plurality of tubes.

* * * * *